Aug. 11, 1931. C. W. CARPENTER 1,817,917
VALVE
Filed March 3, 1930 2 Sheets-Sheet 1

INVENTOR.
CARL W. CARPENTER
BY
ATTORNEYS.

Aug. 11, 1931.        C. W. CARPENTER         1,817,917
VALVE
Filed March 3, 1930           2 Sheets-Sheet 2

INVENTOR.
CARL W. CARPENTER
BY
ATTORNEYS.

Patented Aug. 11, 1931

1,817,917

UNITED STATES PATENT OFFICE

CARL W. CARPENTER, OF SANTA BARBARA, CALIFORNIA

VALVE

Application filed March 3, 1930. Serial No. 432,962.

My invention relates generally to valves for controlling the flow of fluids, and it is a purpose of my invention to provide a valve embodying means by which the seat of the valve and its seat engaging element can be ground when worn, with the utmost ease and dispatch to produce a fluid tight joint between the two in the closed position of the valve, all without the necessity of removing the valve from the pipe line with which it is associated, and thus obviating replacement of the valve with the attendant expense and loss of time, when it is only required that the valve be reground in order to again render it serviceable.

I will describe only one form of valve embodying my invention and will then point out the novel features thereof in claims.

In the accompanying drawings.

Figure 1:
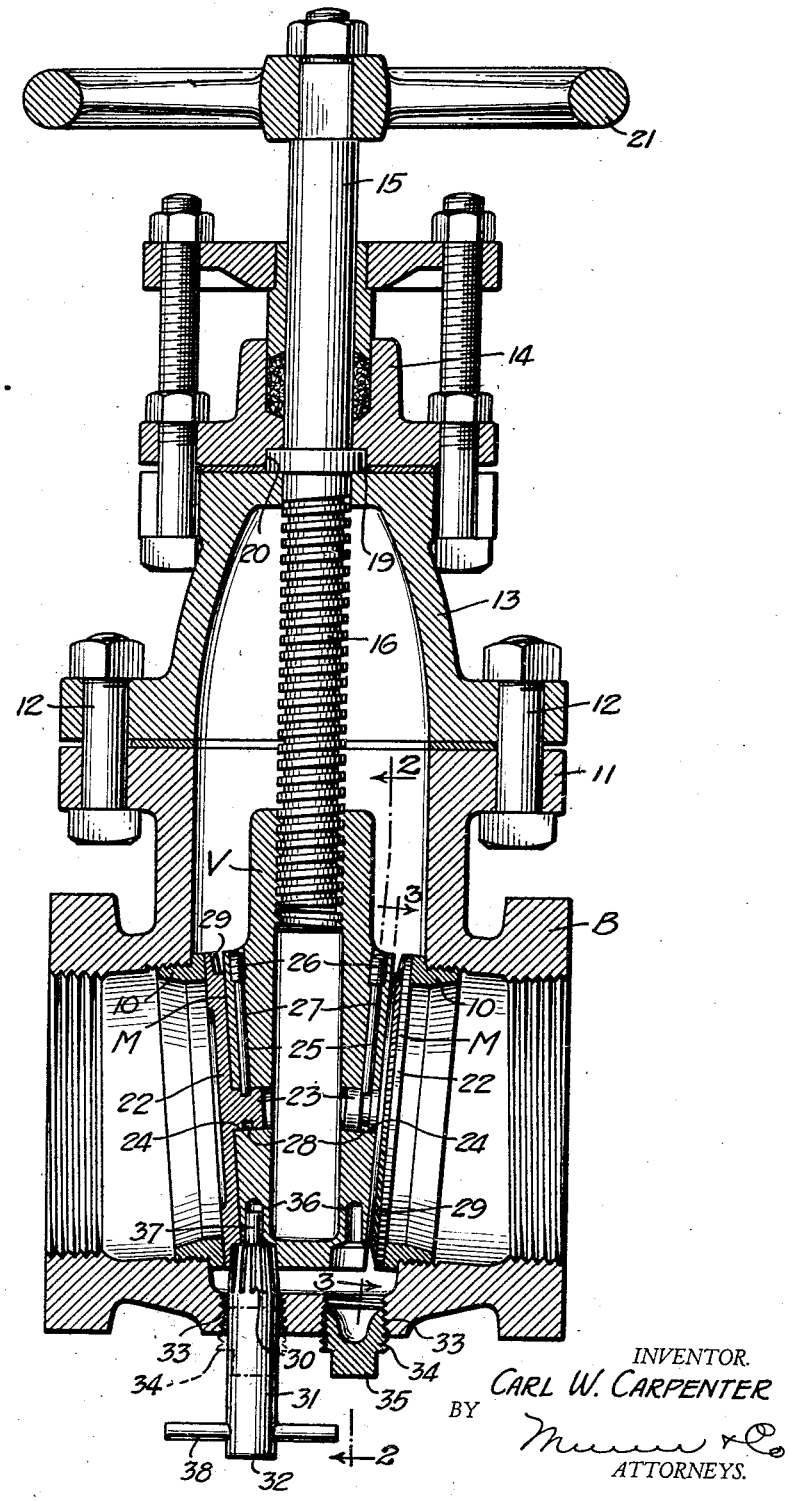
Figure 1 is a view showing in vertical longitudinal section, one form of valve embodying my invention, and illustrating an instrument correlated with a seat engaging element of the valve to effect grinding of the element against its seat.
Figure 2:
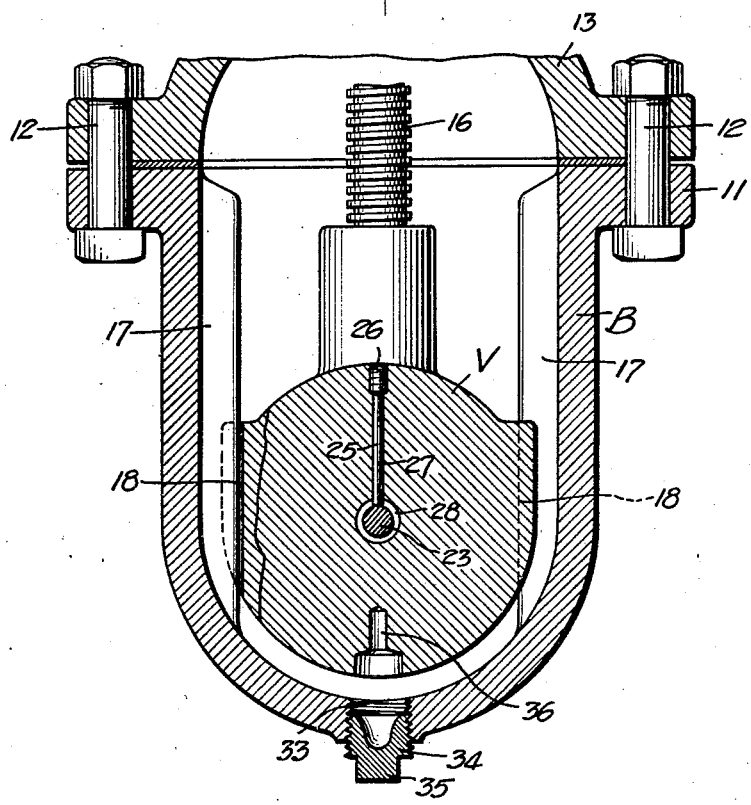
Figure 2 is a fragmentary transverse sectional view taken on the line 2—2 of Figure 1 and looking in the direction of the arrows.
Figure 3:
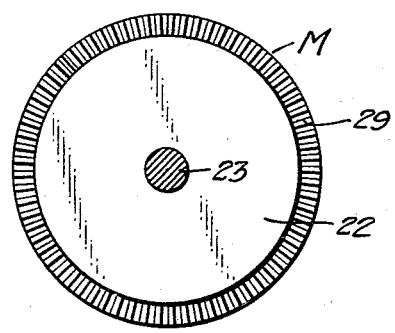
Figure 3 is a fragmentary sectional view taken on the line 3—3 of Figure 1 and looking in the direction of the arrows.

Referring specifically to the drawings in which similar reference characters designate similar parts in each of the several views, my invention in its present embodiment is shown in the form of a gate valve comprising a body B in which is supported a pair of relatively inclined and spaced apart annular seats 10. The body is provided with a flange 11 to which is secured by bolts 12, a bonnet 13 carrying a suitable stuffing box 14 through which extends a stem 15 threaded at 16 for threaded connection to a valve element V interposed between the seats 10 and mounted for sliding movement in the body by means of ribs 17 projecting from the latter into grooves 18 in the valve element. The stem 15 is provided with an integral and annular collar 19 rotatable freely in a recess 20 in the stuffing box 14 so as to confine the stem against longitudinal displacement yet permit the stem to be rotated by a hand wheel 21 fixed thereto, and thus feed the valve element towards and away from the seats 10 as will be understood.

The valve element is provided with a pair of seat engaging members M identical in construction and each of which is in the form of a disk 22 provided axially with a stub shaft 23 journaled in a bore 24 in the valve element and confined against displacement by means of a pin 25 having an enlarged portion 26 threaded into the valve element, and a reduced unthreaded portion 27 extending through an opening in the valve element and projecting into a groove 28 in the stub shaft.

The stub shafts 23 each broadly constitute a means for mounting the respective seat engaging member M on the valve element V for rotation in a plane parallel to the respective seat 10, and it will be clear that as the valve element is actuated to engage and disengage the members M from the seats 10, that there will be a tendency for the members to slightly rotate about their respective axes to produce a grinding action between the members and seats.

Each of the seat engaging members is capable of being positively rotated or oscillated to grind the members upon their seats, and to this end each of the members is provided with a circular series of teeth 29 concentric with the axis of the member, with which teeth 30, provided on the shank 31 of an instrument or tool 32, are adapted to be meshed.

To permit access to the teeth of the members with the instrument 32, the body B is provided with a pair of threaded openings 33 normally closed by plugs 34 having wrench receiving portions 35 by which they can be removed from the openings to permit insertion of the shank 31 of the instrument through the openings into the body.

The valve element is provided with sockets 36 into which journals 37 on the shank 31 of the instrument are insertable to maintain the teeth 30 of the instrument in mesh with the teeth of one member M or the other, and permit the instrument to be rotated to effect rotation of the members by means of a handle 38 projecting from the shank of the instrument.

When the valve is to be reground, the bonnet 13 is removed and the valve element V with the seat engaging members M withdrawn from the body so as to permit a suitable grinding compound to be applied to the seat engaging surfaces of the members, after which the bonnet is replaced and the valve element actuated by the hand wheel 21, to engage the members M lightly against the respective seats 10.

The plugs 34 are removed from the openings 33 and the shank 31 of the instrument 32 inserted through one opening or the other to mesh the teeth 30 with the teeth 29 of one member M or the other as shown in Figure 1. The instrument is now rotated or oscillated by the handle 38 to effect corresponding movement of the respective member M against its seat until sufficient grinding of the two has been effected to insure a fluid tight joint between the member and seat when the valve is tightly closed.

The instrument 32 is applied in this manner to each member M, and when the grinding operation is completed, the openings 33 are closed by the plugs 34, and the valve is again ready for use.

Although I have herein shown and described only one form of valve embodying my invention, it is to be understood that various changes and modifications may be made therein without departing from the spirit of the invention and the spirit and scope of the appended claims.

I claim:

1. A valve comprising a body having a seat, a valve element mounted in the body for co-action with the seat and having a seat engaging member, a stub shaft on the seat engaging member journaled in the valve element to mount said member on the valve element for rotation in a plane parallel to the seat for grinding co-action with the latter, and means for confining the stub shaft against displacement from the valve element, comprising an annular groove in the stub shaft, and a pin in the valve element projecting into said groove.

2. A valve comprising a body having a seat, a valve element mounted in the body for co-action with the seat and having a seat engaging member, means for mounting said member on the valve element for rotation in a plane parallel to the seat for grinding co-action with the latter, the valve body having an opening, the seat engaging member having teeth, an instrument insertable through said opening into the valve body and having teeth engageable with the teeth of said member for co-action therewith in rotating the member, and a closure for the opening.

3. A valve comprising a body having a seat, a valve element mounted in the body for co-action with the seat and having a seat engaging member, means for mounting said member on the valve element for rotation in a plane parallel to the seat for grinding co-action with the latter, the valve body having an opening, the seat engaging member having teeth, an instrument insertable through said opening into the valve body and having teeth engageable with the teeth of said member for co-action therewith in rotating the member, and a closure for the opening, the valve element having a socket in which the instrument can be journaled to maintain the teeth of the instrument in mesh with the teeth of the seat engaging member.

4. A valve comprising a valve body having an annular seat, a valve element mounted in the body for co-action with said seat and having a disk engageable with the latter, means for mounting the disk on the valve element for rotation in a plane parallel to the seat for grinding co-action therewith, the valve body having an opening, the disk having teeth concentric with its axis, an instrument insertable through said opening into the body and having teeth engageable with the teeth of the disk to rotate the latter in response to rotation of the instrument, and a closure for said opening.

5. A valve comprising a body having a seat, a valve element mounted in the body for co-action with the seat and having a seat engaging member, a stub shaft carried by the seat engaging member, journaled in the valve element to mount the member on the latter for rotation in a plane parallel to the seat, the stub shaft having an annular groove, a pin in the valve element projecting into the groove to confine the stub shaft against displacement, the body having an opening through which an instrument is insertable into the body for engagement with said member, said member having teeth with which the instrument is adapted to be engaged to effect rotation of the member, and a closure for said opening.

CARL W. CARPENTER.